United States Patent
Kita et al.

(10) Patent No.: US 9,902,443 B2
(45) Date of Patent: Feb. 27, 2018

(54) IDLER WHEEL AND CRAWLER-TYPE TRAVEL DEVICE

(71) Applicant: KOMATSU LTD., Tokyo (JP)

(72) Inventors: Naoaki Kita, Hirakata (JP); Minoru Katayama, Hirakata (JP); Kenichi Hisamatsu, Hirakata (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 15/121,890

(22) PCT Filed: Apr. 16, 2014

(86) PCT No.: PCT/JP2014/060851
§ 371 (c)(1),
(2) Date: Aug. 26, 2016

(87) PCT Pub. No.: WO2015/159393
PCT Pub. Date: Oct. 22, 2015

(65) Prior Publication Data
US 2017/0120971 A1    May 4, 2017

(51) Int. Cl.
*B62D 55/14*    (2006.01)
*B62D 55/20*    (2006.01)

(52) U.S. Cl.
CPC ............ *B62D 55/145* (2013.01); *B62D 55/20* (2013.01)

(58) Field of Classification Search
CPC .............................. B62D 55/14; B62D 55/145
See application file for complete search history.

(56) References Cited

U.S. PATENT DOCUMENTS 3,603,650 A * 9/1971 Miller ................. B62D 55/145
305/137
4,034,618 A    7/1977 Graff et al.
(Continued)

FOREIGN PATENT DOCUMENTS

CN    1330009 A    1/2002
CN    203383260 U    1/2014
(Continued)

OTHER PUBLICATIONS

The Office Action for the corresponding Chinese application No. 2014800757043 dated May 19, 2017.
(Continued)

*Primary Examiner* — Kip T Kotter
(74) *Attorney, Agent, or Firm* — Global IP Counselors, LLP

(57) ABSTRACT

An idler wheel includes a disk shaped idler body, and a plurality of wear plate assemblies disposed to encircle a circumferential surface of the idler body. Each of the wear plate assemblies has an arc shaped wear plate disposed on the circumferential surface of the idler body, a first fixing member fixing the wear plate to the idler body, and a first fastening tool fastening the first fixing member to the idler body. Each wear plate has a crawler belt contact surface, a guide part protruding from the crawler belt contact surface to guide a crawler belt on the crawler belt contact surface, a first abutting surface abutting the idler body and being perpendicular to an axial direction, and a second abutting surface abutting the idler body and being perpendicular to the axial direction. The first abutting surface faces the second abutting surface in the axial direction.

17 Claims, 12 Drawing Sheets

(56) References Cited

U.S. PATENT DOCUMENTS

| | | | | |
|---|---|---|---|---|
| 4,818,041 | A * | 4/1989 | Oertley | B62D 55/145 |
| | | | | 295/20 |
| 7,914,086 | B2 * | 3/2011 | Mulligan | B62D 55/145 |
| | | | | 305/137 |
| 8,360,535 | B2 * | 1/2013 | Johannsen | B62D 55/0966 |
| | | | | 305/137 |
| 2002/0047306 | A1 | 4/2002 | Watanabe et al. | |
| 2008/0217994 | A1 * | 9/2008 | McRae | B62D 55/14 |
| | | | | 305/199 |
| 2010/0072813 | A1 * | 3/2010 | McRae | B62D 55/14 |
| | | | | 305/120 |
| 2010/0102623 | A1 | 4/2010 | Mulligan | |

FOREIGN PATENT DOCUMENTS

| | | | |
|---|---|---|---|
| JP | 45-23070 | A | 9/1970 |
| JP | 4523070 | Y1 * | 9/1970 |
| JP | 50-47133 | U | 5/1975 |
| JP | 57066077 | A * | 4/1982 |
| JP | 613082 | U * | 1/1983 |
| JP | 61-3082 | U | 1/1986 |
| JP | 1-278890 | A | 11/1989 |
| JP | 5-85428 | A | 4/1993 |
| JP | 2014-4957 | A | 1/2014 |

OTHER PUBLICATIONS

The International Search Report for the corresponding international application No. PCT/JP2014/060851, dated Jul. 15, 2014.
The Office Action for hte corresponding Japansese application No. 2014-536461, dated Sep. 16, 2014.

* cited by examiner

IDLER WHEEL AND CRAWLER-TYPE TRAVEL DEVICE

CROSS-REFERENCE TO RELATED APPLICATIONS

This application is a U.S. National stage application of International Application No. PCT/JP2014/060851, filed on Apr. 16, 2014.

BACKGROUND

Field of the Invention

The present invention relates to an idler wheel and a crawler-type travel device.

Background Information

Conventionally, a crawler-type travel device provided with a crawler belt wound onto an idler wheel and a drive wheel has been widely used in work machines such as bulldozers.

A method for encircling a disk-like idler wheel with a plurality of arc-like wear plates has been proposed (see Japanese Unexamined Patent Application Publication No. H1-278890). The wear plates are fixed onto the idler body with fixing members disposed on the wear plates. The wear plates have crawler belt contact surfaces provided on both sides of the fixing member, and the fixing member functions as a guide part for guiding the crawler belt so that the crawler belt is held in position to abut the crawler belt contact surface.

SUMMARY

However, the fixing member in Japanese Unexamined Patent Application Publication No. H1-278890 is fixed to the idler body with a fastener whereby a force applied from the crawler belt to the fixing member is transferred directly to the fastener. Therefore, there is a fear that the fastener may become damaged.

The present invention takes the above condition into consideration and aims to provide an idler wheel and a crawler-type travel device that are able to suppress damage to the fastener for fixing the wear plate.

An idler wheel according to a first aspect of the present invention is an idler wheel having a crawler belt wound thereon. The idler wheel is provided with a disk-like idler body having a rotational center axis, and a plurality of wear plate assemblies disposed so as to encircle the circumferential surface of the idler body. Each of the plurality of wear plates has an arc-like wear plate disposed on the circumferential surface of the idler body, a first fixing member fixing the wear plate to the idler body, and a first fastener fastening the first fixing member to the idler body. The wear plate includes a crawler belt contact surface which comes into contact with the crawler belt, a guide part that protrudes from the crawler belt contact surface for guiding the crawler belt on the crawler belt contact surface, a first abutting surface which abuts the idler body and is perpendicular to an axial direction of the rotational center axis, and a second abutting surface which abuts the idler body and is perpendicular to the axial direction. The first abutting surface faces the second abutting surface in the axial direction.

According to the idler wheel as in the first aspect, deviation of the wear plate in the axial direction when a force is applied from the crawler belt to the guide part in the axial direction, is suppressed because the first abutting surface and the second abutting surface abut the idler body. Moreover, damage of the first fastener can be suppressed because no force is applied to the first fastener via the first fixing member.

The idler wheel according to the second aspect of the present invention is related to the first aspect and the wear plate has an opening part. The idler body has a protruding part formed on the circumferential surface and disposed inside the opening part. The first abutting surface and the second abutting surface are portions of the inside surface of the opening part and abut the protruding part.

According to the idler wheel according to the second aspect, the wear plate can be made smaller and lighter in comparison to when a portion of the wear plate extends and abuts with both side surfaces of the idler body.

An idler wheel according to a third aspect of the present invention is related to the second aspect, and the guide part is provided on the circumferential edge of the opening part.

According to the idler wheel as in the third aspect, the wear plate can be made smaller and lighter in comparison to when the guide part is formed separately from the opening part because the guide part can be used effectively as the opening part for providing the first abutting surface and the second abutting surface.

The idler wheel according to a fourth aspect of the present invention is related to the second aspect, and the first fixing member is arranged inside the opening part.

According to the idler wheel as in the fourth aspect, contact with the first fixing member is able to suppress the intrusion of sand and the like between the crawler belt and the idler wheel.

The idler wheel according to a fifth aspect of the present invention is related to the first aspect, and the idler body has an outer surface that is joined to the circumferential surface, and an inner surface that is joined to the circumferential surface and is provided on the opposite side of the outer surface. The wear plate has a first extending part that extends on the outer surface and a second extending part that extends on the inner surface. The first abutting surface abuts the outer surface and the second abutting surface abuts the inner surface.

According to the idler wheel as in the fifth aspect, because the size and shape of the first abutting surface and the second abutting surface can be designed freely, shifting of the wear plate can be suppressed more effectively.

The idler wheel according to a sixth aspect of the present invention is related to the first aspect, and each of a plurality of wear plate assemblies has a second fixing member fixing the wear plate to the idler body, and a second fastener fastening the second fixing member to the idler body. The first fixing member is spaced away from the second fixing member in the circumferential direction around the rotational center axis.

According to the idler wheel as in the sixth aspect, because the wear plate can be fixed by the first fixing member and the second fixing member, the rise of a portion of the wear plate from the idler body when the wear plate is pressed by the crawler belt can be suppressed.

The idler wheel according to a seventh aspect of the present invention is related to the sixth aspect and the guide part of the wear plate has an opening part that extends in the circumferential direction. The first fixing member and the second fixing member are disposed inside the opening part.

According to the idler wheel as in the seventh aspect, the wear plate can be made lighter by increasing the size of the opening part.

The idler wheel according to an eighth aspect of the present invention is related to the first to seventh aspects, and the wear plate has a first locking part for locking the first fixing member and the idler body, and a first cushioning member disposed between the first locking part and the first fixing member.

According to the idler wheel as in the eighth aspect, play of the wear plate with regard to the idler body can be suppressed.

The idler wheel according to a ninth aspect of the present invention is related to the first to eighth aspects, and the plurality of wear plate assemblies include a first wear plate and a second wear plate adjacent to each other. The first wear plate and the second wear plate each include a first crawler belt contact surface and a second crawler belt contact surface. The first wear plate includes a first end part which defines an end on the second wear plate side of the first crawler belt contact surface, and a second end part which defines an end on the second wear plate side of the second crawler belt contact surface, as seen in a plan view. The first end part is inclined with respect to the axial direction.

According to the idler wheel as in the ninth aspect, linear contact between the crawler belt and the first crawler belt contact surface can be limited in comparison to when the first end part is parallel to the axial direction. Therefore, local wear near the first end part can be limited because the load pressure applied near the first end part is reduced.

The idler wheel according to a tenth aspect of the present invention is related to the ninth aspect and the second end part is inclined with respect to the axial direction.

According to the idler wheel as in the tenth aspect, contact between the crawler belt and the second crawler belt contact surface can be limited in comparison to when the second end part is parallel to the axial direction. Therefore, local wear near the second end part can be limited because the load pressure applied near the second end part is reduced.

The idler wheel according to an eleventh aspect of the present invention is related to the ninth or tenth aspect, and the second wear plate includes a third end part which defines an end on the first wear plate side of the first crawler belt contact surface, and a fourth end part which defines an end on the first wear plate side of the second crawler belt contact surface, as seen in a plan view. The third end part is inclined with respect to the axial direction.

According to the idler wheel as in eleventh aspect, linear contact between the crawler belt and the first crawler belt contact surface can be limited in comparison to when the third end part is parallel to the axial direction. Therefore, local wear near the third end part can be limited because the load pressure applied near the third end part is reduced.

The idler wheel according to a twelfth aspect of the present invention is related to the eleventh aspect, and the fourth end part is inclined with respect to the axial direction.

According to the idler wheel as in twelfth aspect, contact between the crawler belt and the second crawler belt contact surface can be suppressed in comparison to when the fourth end part is parallel to the axial direction. Therefore, local wear near the fourth end part can be suppressed because the load pressure applied near the fourth end part is reduced.

The idler wheel according to a thirteenth aspect of the present invention is related to the twelfth aspect, and the first end part and the third end part exhibit point symmetry based on a predetermined symmetrical center point as seen in a plan view, and the second end part and the fourth end part exhibit point symmetry based on a predetermined symmetrical center point as seen in a plan view.

According to the idler wheel as in the thirteenth aspect, productivity of the wear plates can be improved because the external contours of the first wear plate and the second wear plate are the same.

A crawler-type travel device according to fourteenth aspect of the present invention is provided with a track frame, a sprocket wheel disposed in front of or to the rear of the track frame, the idler wheel described in any one of the first to thirteenth aspects disposed on the opposite side of the sprocket wheel with the track frame interposed therebetween, and a crawler belt wound onto the sprocket wheel and the idler wheel.

According to the present invention, an idler wheel and a crawler-type travel device can be provided that are able to suppress damage to the fasteners for fixing the wear plates.

DESCRIPTION OF EMBODIMENTS

Hereinbelow, a configuration of a crawler-type travel device provided with an idler wheel according to an embodiment will be discussed with reference to the drawings. In the following discussion, "up," "down," "front," and "rear" are terms based on the perspective of an operator seated in the operator's seat of the work machine to which the crawler-type travel device is attached. Moreover, "inside" and "outside" are terms based on the center line in the width direction of the work machine to which the crawler-type travel device is attached.

(Configuration of Crawler-Type Travel Device 1)

Figure 1:
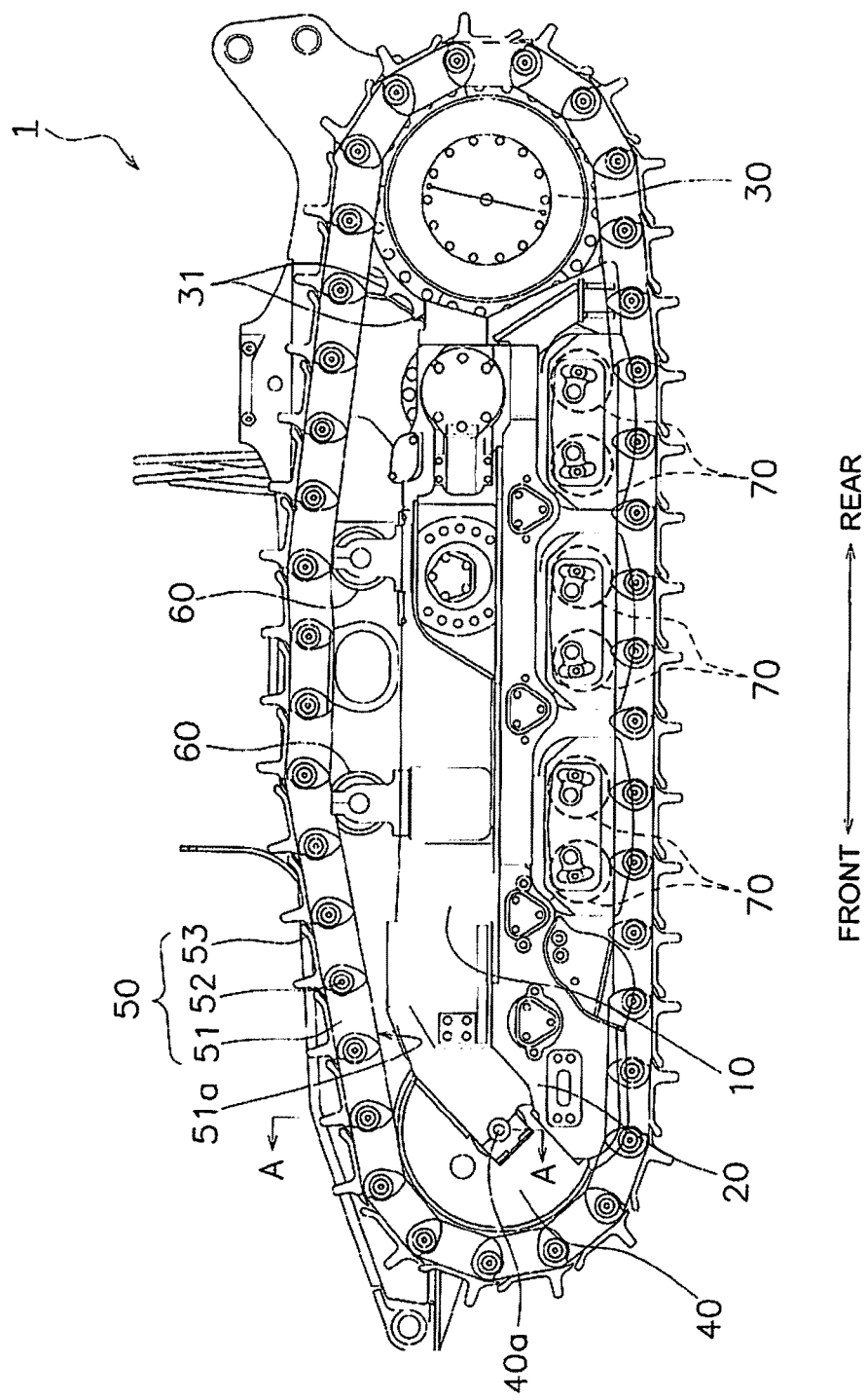
FIG. 1 is a side view of a crawler-type travel device.

FIG. 1 is a side view of a crawler-type travel device 1 according to an embodiment. The crawler-type travel device 1 is provided with a track frame 10, an idler movement mechanism 20, a sprocket wheel 30, an idler wheel 40, a crawler belt 50, two carrier rollers 60, and six track rollers 70.

The track frame 10 is a framework of a vehicle body of a work machine (for example, a bulldozer or an excavator and the like) which is not shown in the drawings. The track frame 10 extends in the front-back direction.

The idler movement mechanism 20 is attached at the front end part of the track frame 10. The idler movement mechanism 20 is able to move forward and backward with respect to the track frame 10. The idler movement mechanism 20 regulates the tension of the crawler belt 50 which fluctuates in accordance with the shape of the ground surface by changing the position of the idler wheel 40 with respect to the sprocket wheel 30 while the crawler-type travel device 1 is traveling.

The sprocket wheel 30 is disposed to the rear of the track frame 10. The sprocket wheel 30 rotates and drives due to a hydraulic motor which is not shown in the drawings. The crawler belt 50 is wound onto the sprocket wheel 30. The sprocket wheel 30 has teeth 31 which mesh with the crawler belt 50.

The idler wheel 40 is disposed in front of the track frame 10. The idler wheel 40 is supported in a rotatable manner by the idler movement mechanism 20. The idler wheel 40 is attached to the idler movement mechanism 20 via a support shaft 40*a*. The crawler belt 50 is wound onto the idler wheel 40. The configuration of the idler wheel 40 is described below.

The crawler belt 50 is wound onto the sprocket wheel 30 and the idler wheel 40. The crawler-type travel device 1 travels due to the crawler belt 50 moving in a circular manner due to the rotational driving of the sprocket wheel 30. The crawler belt 50 has a plurality of track links 51, a plurality of shaft bearing parts 52, and a plurality of shoe plates 53. Two adjacent track links 51 are linked in a pivotable manner by a shaft bearing part 52. The track links 51 each have rail surfaces 51*a* which have right-left symmetry. The right-left symmetrical rail surfaces 51*a* come into contact with first and second crawler belt contact surfaces 200*a*, 200*b* of a wear plate 200 which is described below. The rail surfaces 51*a* are formed in a substantially planar manner. The shaft bearing parts 52 are each configured by a pin which passes through two adjacent track links 51 and a bushing which is externally engaged with the pin.

The two carrier rollers 60 are disposed on the upper side of the track frame 10. The carrier rollers 60 guide the crawler belt 50 from below. The two carrier rollers 60 are spaced away from each other in the front-back direction. The carrier rollers 60 turn in response to contact with the crawler belt 50.

The six track rollers 70 are disposed on the lower side of the track frame 10. The six track rollers 70 distribute the vehicle body weight applied to the crawler belt 50. The six track rollers 70 are spaced away from each other in the front-back direction. The track rollers 70 turn in response to contact with the crawler belt 50.

(Configuration of Idler Wheel 40)

Figure 2:
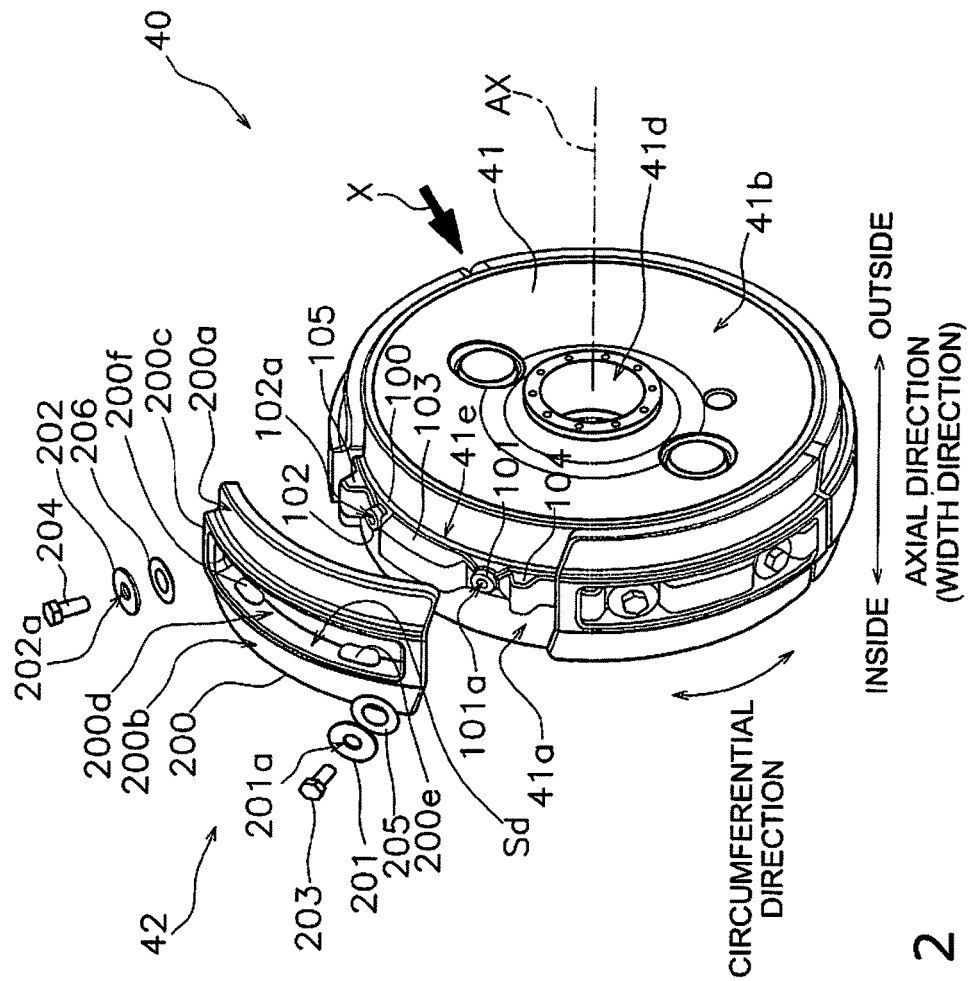
FIG. 2 is a perspective view of an idler wheel.
Figure 3:
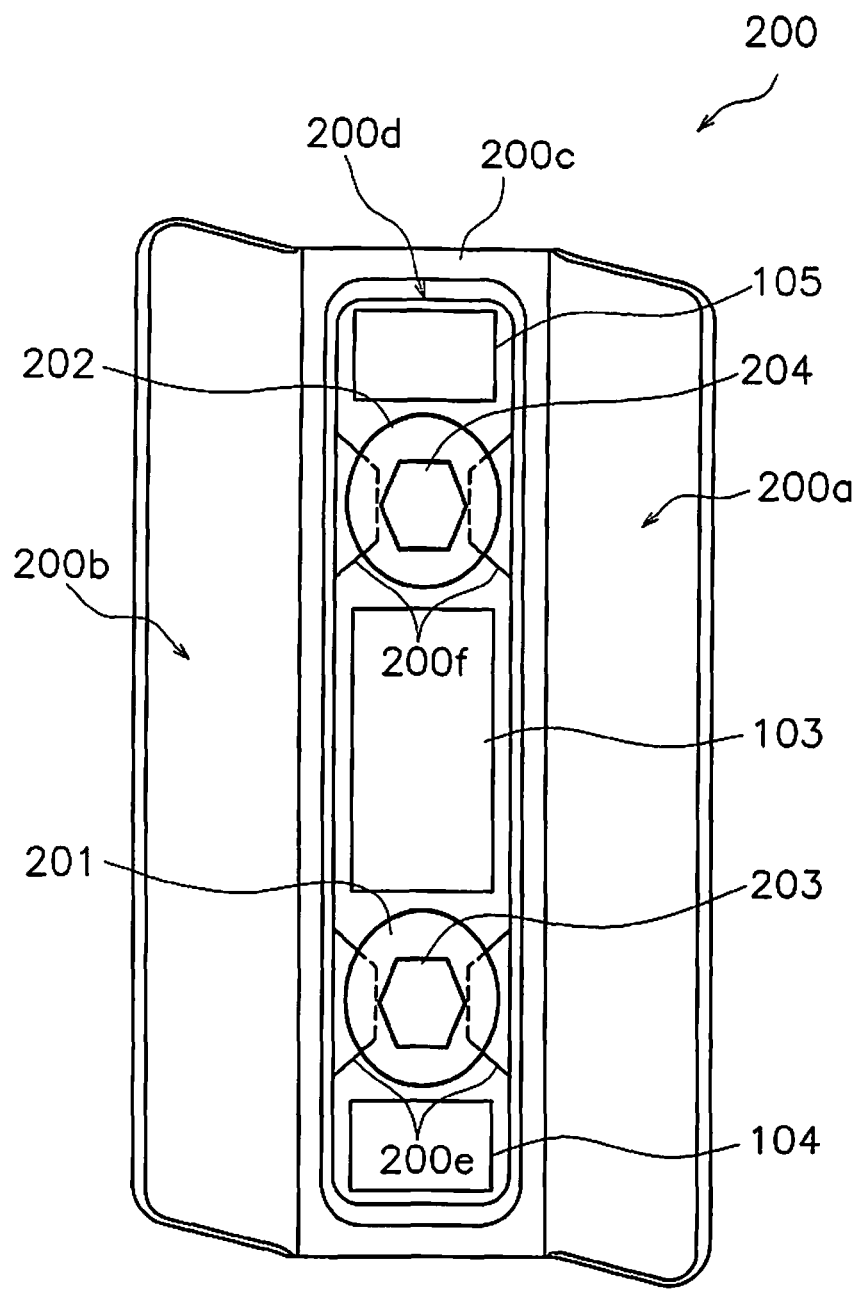
FIG. 3 is a plan view of a wear plate assembly.
Figure 4:
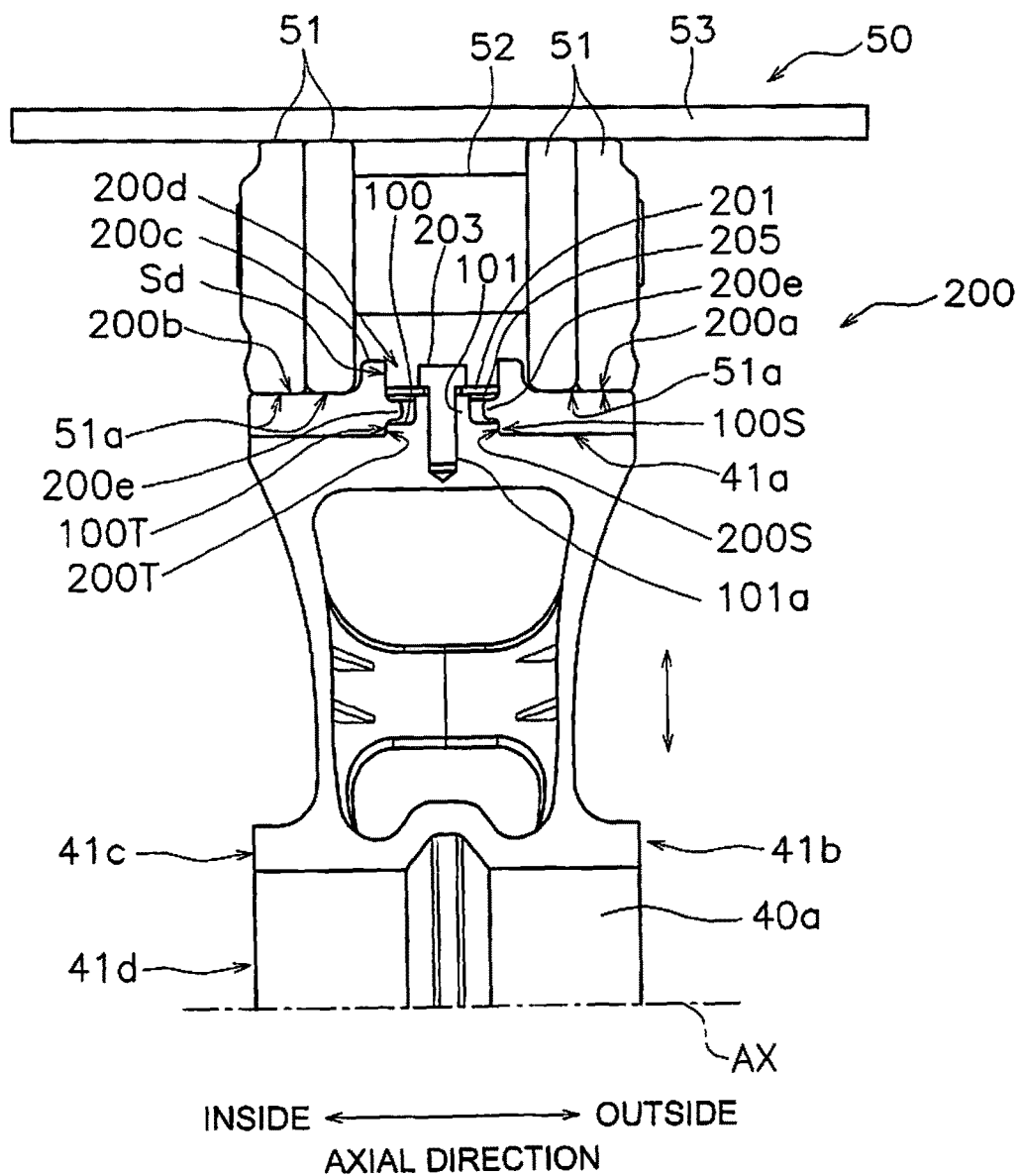
FIG. 4 is a sectional view along line A-A of FIG. 1.

FIG. 2 is a perspective view of the idler wheel 40. FIG. 3 is a plan view of a wear plate assembly 42. FIG. 4 is a sectional view along line A-A in FIG. 1. In FIG. 2, one wear plate assembly 42 is illustrated in a dismantled state in order to discuss the configuration of the idler wheel 40.

The idler wheel 40 is provided with an idler body 41 and five wear plate assemblies 42.

The idler body 41 is formed in a disk-like manner having the rotational center axis AX. The idler body 41 has a circumferential surface 41*a*, an outer surface 41*b*, and inner surface 41*c*, an insertion hole 41*d*, and a protruding part 41*e*.

The circumferential surface 41*a* represents the entire side surface of the idler body 41. The outer surface 41*b* is joined to the circumferential surface 41*a*. The outer surface 41*b* is the surface disposed in the outward orientation in the width direction when the crawler-type travel device 1 is attached to the work machine. The inner surface 41*c* is joined to the circumferential surface 41*a*. The inner surface 41*c* is provided on the opposite side of the outer surface 41*b*. The inner surface 41*c* is the surface disposed in the inward orientation in the width direction when the crawler-type travel device 1 is attached to the work machine. The insertion hole 41*d* is formed along the rotational center axis AX in the center of the idler body 41. As illustrated in FIG. 4, the support shaft 40*a* is inserted into the insertion hole 41*d*.

The protruding part 41*e* is formed on the circumferential surface 41*a*. The protruding part 41*e* is arranged inside an opening section 200*d* of the wear plate 200 described below. The protruding part 41*e* has a support part 100, a first boss 101, a second boss 102, a first island part 103, a second island part 104, and a third island part 105.

The support part 100 is formed so as to extend in the circumferential direction around the rotational center axis AX. In the present embodiment, the support part 100 is formed in a tonic manner. That is, the support part 100 is formed continuously over the entire circumference of the circumferential surface 41*a*. The support part 100 supports the wear plate 200 so as to prevent shifting in the axial direction of the rotational center axis AX (that is, the width direction) when a force is applied to the wear plate 200 from the crawler belt 50 in the axial direction.

As illustrated in FIG. 4, the support part 100 a first support surface 100S and a second support surface 100T. The first support surface 100S is provided perpendicular to the axial direction of the rotational center axis AX. The first support surface 100S is formed in an arc-like manner extending in the circumferential direction. The second support surface 100T is provided perpendicular to the axial direction of the rotational center axis AX. The second support surface 100T is formed in an arc-like manner extending in the circumferential direction. The first support surface 100S is provided on the opposite side of the second support surface 100T. The first support surface 100S and the second support surface 100T may be referred to as an "abutted surface" because the surfaces abut with the wear plate 200.

The first boss 101 is formed in an integrated manner on the support part 100. The first boss 101 is disposed between the first island part 103 and the second island part 104 in the circumferential direction. The first boss 101 is formed in a truncated cone shape. A first fastener 203 described below is inserted into the first boss 101. As illustrated in FIG. 4, a first fastening hole 101*a* into which the first fastener 203 is inserted passes through the first boss 101 and the support part 100 to reach the idler body 41 in the same way as the first fastening hole 101*a*. The first fastening hole 101*a* is formed in the radial direction relative to the rotational center axis AX.

The second boss 102 is formed in an integrated manner on the support part 100. The second boss 102 is disposed between the first island part 103 and the third island part 105 in the circumferential direction. The second boss 102 is formed in a truncated cone shape. A second fastener 204 described below is inserted into the second boss 102. A second fastening hole 102*a* into which the second fastener 204 is inserted passes through the second boss 102 and the support part 100 to reach the idler body 41. The second fastening hole 102*a* is formed in the radial direction.

The first to third island parts 103 to 105 are formed integrally on the support part 100. The first to third island parts 103 to 105 are each formed in a trapezoidal shape. The first island part 103 is disposed between the first boss 101 and the second boss 102 in the circumferential direction. The second island part 104 is formed on the opposite side of the first island part 103 with the first boss 101 interposed therebetween. The third island part 105 is formed on the opposite side of the first island part 103 with the second boss 102 interposed therebetween. In the present embodiment, the first to third island parts 103 to 105 do not abut with the wear plate assemblies 42.

The five wear plate assemblies 42 are disposed in order to encircle the circumferential surface 41*a* of the idler body 41. The five wear plate assemblies 42 each have the wear plate 200, a first fixing plate (first fixing member) 201, a second fixing plate (second fixing member) 202, the first fastener 203, the second fastener 204, a first cushioning member 205, and a second cushioning member 206.

The wear plate 200 is an arc-like plate member as seen in the width direction. The wear plate 200 may be configured, for example, from a steel plate and the like. As illustrated in FIGS. 2 to 4, the wear plate 200 has a first crawler belt contact surface 200a, a second crawler belt contact surface 200b, a guide part 200c, an opening part 200d, a pair of first locking parts 200e, and a pair of second locking parts 200f. The planar shape of the wear plate 200 will be described below.

The first crawler belt contact surface 200a is the circumferential surface on the outside in the width direction of the wear plate 200. The second crawler belt contact surface 200b is the circumferential surface on the inside in the width direction of the wear plate 200. The first and second crawler belt contact surfaces 200a and 200b are both formed in an arc-like manner extending in the circumferential direction. The first crawler belt contact surface 200a is formed on the opposite side of the second crawler belt contact surface 200b with the guide part 200c interposed therebetween.

As illustrated in FIG. 4, the first and second crawler belt contact surfaces 200a and 200b both come into contact with the pair of rail surfaces 51a of the track links 51 of the crawler belt 50. As a result, the first and second crawler belt contact surfaces 200a and 200b wear easily and the first and second crawler belt contact surfaces 200a and 200b are preferably subjected to hardening using a hardening technique such as quenching processing, carburization, or nitriding or a surface treatment technique such as physical vapor deposition (PVD), chemical vapor deposition (CVD), or ion coating and the like. Specifically, the first and second crawler belt contact surfaces 200a and 200b preferably have a hardness HRC of 45 or greater.

The first and second crawler belt contact surfaces 200a and 200b are examples of a crawler belt contact surface which comes into contact with the track links 51 of the crawler belt 50. The shape and size of the first and second crawler belt contact surfaces 200a and 200b may be modified as appropriate.

The guide part 200c is formed between the first and second crawler belt contact surfaces 200a and 200b. The guide part 200c extends in the circumferential direction. The guide part 200c protrudes to the outside in the radial direction further than the first and second crawler belt contact surfaces 200a and 200b. As illustrated in FIG. 4, the guide part 200c is a flange that guides the track links 51 so as to suitably abut with the first and second crawler belt contact surfaces 200a and 200b.

The opening part 200d is formed in the guide part 200c. The opening part 200d extends in the circumferential direction. The protruding part 41e of the idler body 41 is disposed inside the opening part 200d. Moreover, the first fixing plate 201, the second fixing plate 202, the first fastener 203, the second fastener 204, the first cushioning member 205, and the second cushioning member 206 are disposed inside the opening part 200d. The opening part 200d has an inner side surface Sd.

As illustrated in FIG. 4, the inner side surface Sd includes a first abutting surface 200S and a second abutting surface 200T. The first abutting surface 200S and the second abutting surface 200T are the regions of the inner side surface Sd nearest the idler body 41 in the radial direction. The first abutting surface 200S is provided perpendicular to the axial direction. The first abutting surface 200S is formed in an arc-like manner extending in the circumferential direction. The second abutting surface 200T is provided perpendicular to the axial direction. The second abutting surface 200T is formed in an arc-like manner extending in the circumferential direction. The first abutting surface 200S is provided so as to face the second abutting surface 200T in the axial direction. The first abutting surface 200S abuts the first support surface 100S of the support part 100. The second abutting surface 200T abuts the second support surface 100T of the support part 100.

In this way, the wear plate 200 does not shift even when a force in the axial direction is applied by the crawler belt 50 due to the first abutting surface 200S and the second abutting surface 200T abutting the idler body 41.

The pair of first locking parts 200e are formed on the inner side surface Sd of the opening part 200d. The pair of first locking parts 200e are disposed on the outside in the radial direction of the first and second abutting surfaces 200S and 200T on the inner side surface Sd. The pair of first locking parts 200e protrude inside the opening part 200d. As illustrated in FIG. 4, the pair of first locking parts 200e are formed symmetrically around the first fastener 203. Each of the pair of first locking parts 200e is disposed on the support part 100 of the idler body 41. Each of the pair of first locking parts 200e is spaced away from the first boss 101 of the idler body 41.

The pair of second locking parts 200f are formed on the inner side surface Sd of the opening part 200d. The pair of second locking parts 200f are spaced away from the pair of first locking parts 200e in the circumferential direction. The pair of second locking parts 200f are disposed on the outside in the radial direction of the first and second abutting surfaces 200S and 200T on the inner side surface Sd. The pair of second locking parts 200f protrude inside the opening part 200d. The pair of second locking parts 200f are formed symmetrically around the second fastener 204 in the same way as the pair of first locking parts 200e. Each of the pair of second locking parts 200f is disposed on the support part 100 of the idler body 41. Each of the pair of second locking parts 200f is spaced away from the second boss 102 of the idler body 41.

The first fixing plate 201 is a plate-like annular member for fixing the wear plate 200 to the idler body 41. The first fixing plate 201 has an insertion hole 201a into which the first fastener 203 is inserted. The first fixing plate 201 is fastened to the idler body 41 by the first fastener 203. The first fastener 203 is inserted into the first fastening hole 101a of the idler body 41. The material, shape or size of the first fastener 203 is not limited in particular so long as the first fixing plate 201 can be fixed to the idler body 41. The first fastener 203 is a bolt in the present embodiment.

The second fixing plate 202 is a plate-like annular member for fixing the wear plate 200 to the idler body 41. The second fixing plate 202 has an insertion hole 202a into which the second fastener 204 is inserted. The second fixing plate 202 is fastened to the idler body 41 by the second fastener 204. The second fastener 204 is inserted into the second fastening hole 102a of the idler body 41. The material, shape or size of the second fastener 204 is not limited in particular so long as the second fixing plate 202 can be fixed to the idler body 41. The second fastener 204 is a bolt in the present embodiment.

The first cushioning member 205 is disposed between the pair of first locking parts 200e and the first fixing plate 201. The material, shape, or size of the first cushioning member 205 is not limited in particular so long as direct contact of the pair of first locking parts 200e with the first fixing plate 201 can be suppressed. While a disk spring is used as the first cushioning member 205 in the present embodiment, a toric rubber plate or a general use O-ring may be used in place of the disk spring.

The second cushioning member 206 is disposed between the pair of second locking parts 200f and the second fixing plate 202. The material, shape, or size of the second cushioning member 206 is not limited in particular so long as direct contact of the pair of second locking parts 200f with the second fixing plate 202 can be suppressed. While a disk spring is used as the second cushioning member 206 in the present embodiment, a toric rubber plate or a general use O-ring may be used in place of the disk spring.

(Planar Shape of Wear Plate 200)

Figure 5:
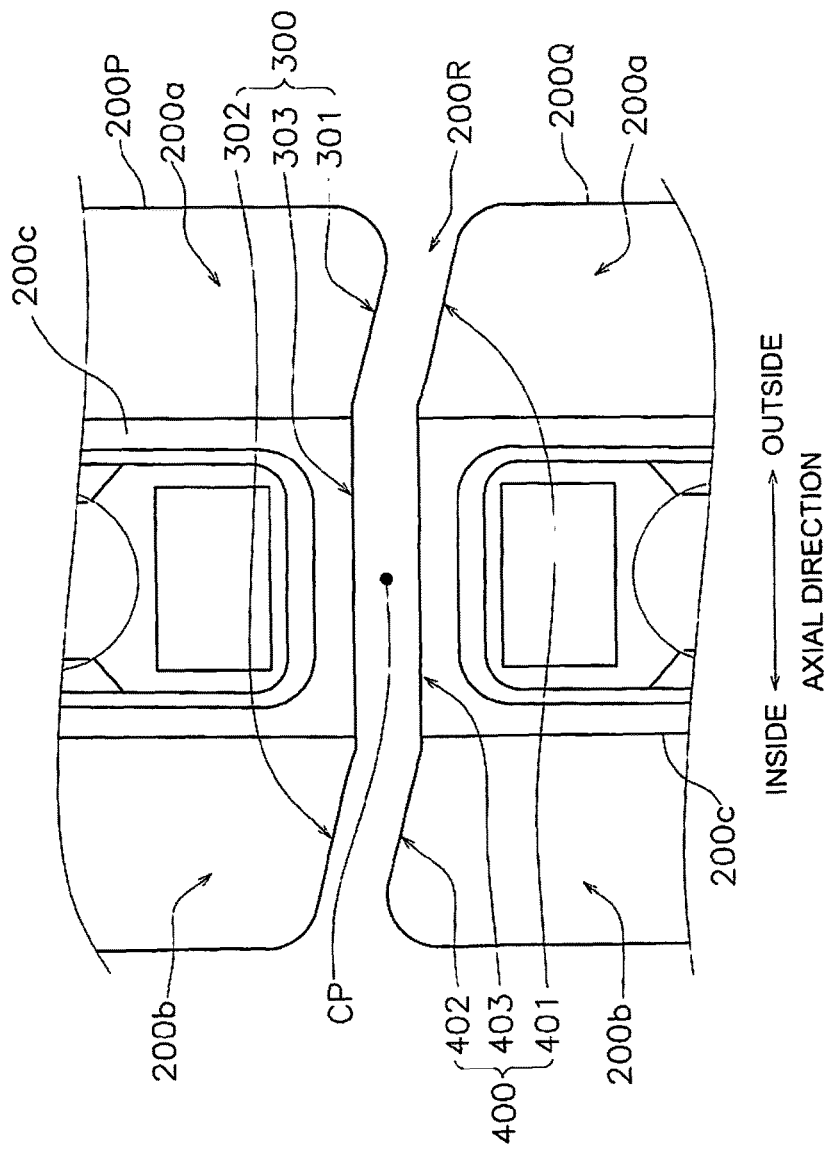
FIG. 5 is a fragmentary view as seen in the direction of arrow X in FIG. 2.

Next, the planar shape of the wear plate 200 will be discussed with reference to the drawings. FIG. 5 is a fragmentary view of a wear plate assembly 42 as seen in the direction of arrow X in FIG. 2. Two adjacent wear plates 200 are depicted in FIG. 5. In the following discussion, one of the two adjacent wear plates 200 is a first wear plate 200P and the other is a second wear plate 200Q. The planar shape of the wear plates 200 in the following discussion is common to all five of the wear plates 200.

The first wear plate 200P has a first end side 300 which defines the end on the first wear plate 200Q side as seen in a plan view of the first wear plate 200P. The term "defines" in the present embodiment signifies the determination of the contour of a member or a region. The first end side 300 opposes the second wear plate 200Q with a predetermined gap therebetween. The first end side 300 includes a first end part 301, a second end part 302, and a first middle part 303.

The first end part 301 defines the end on the second wear plate 200Q side of the first crawler belt contact surface 200a. The first end part 301 is positioned to the outside of the first middle part 303. That is, the first end part 301 is positioned furthest to the outside within the first end side 300 when the crawler-type travel device 1 is attached to the work machine. The first end part 301 is provided in a linear manner in the present embodiment. The first end part 301 is inclined with respect to the axial direction. The first end part 301 extends in the direction orthogonal to the axial direction.

The second end part 302 defines the end on the second wear plate 200Q side of the second crawler belt contact surface 200b. The second end part 302 is positioned on the inside of the first middle part 303. That is, the second end part 302 is positioned furthest to the inside within the first end side 300 when the crawler-type travel device 1 is attached to the work machine. The second end part 302 is provided in a linear manner in the present embodiment. The second end part 302 is inclined with respect to the axial direction. The second end part 302 extends in the direction orthogonal to the axial direction. The second end part 302 is parallel to the first end part 301 in the present embodiment.

The first middle part 303 is provided between the first end part 301 and the second end part 302 and is joined to both end parts. The first middle part 303 is positioned in the middle of the first end side 300. The first middle part 303 is provided in a linear manner in the present embodiment. The first middle part 303 is parallel to the axial direction. The first middle part 303 extends along the axial direction. Therefore, the first middle part 303 is inclined with respect to the first end part 301 and the second end part 302.

The second wear plate 200Q has a second end side 400 which defines the end on the first wear plate 200P side as seen in a plan view of the second wear plate 200Q. The second end side 400 includes a third end part 401, a fourth end part 402, and a second middle part 403.

The third end part 401 defines the end on the first wear plate 200P side of the first crawler belt contact surface 200a. The third end part 401 is positioned to the outside of the second middle part 403. That is, the third end part 401 is positioned furthest to the outside within the second end side 400 when the crawler-type travel device 1 is attached to the work machine. The third end part 401 is provided in a linear manner in the present embodiment. The third end part 401 is inclined with respect to the axial direction. The third end part 401 extends in the direction orthogonal to the axial direction.

The fourth end part 402 defines the end on the first wear plate 200P side of the second crawler belt contact surface 200b. The fourth end part 402 is positioned to the inside of the second middle part 403. That is, the fourth end part 402 is positioned furthest to the inside within the second end side 400 when the crawler-type travel device 1 is attached to the work machine. The fourth end part 402 is provided in a linear manner in the present embodiment. The fourth end part 402 is inclined with respect to the axial direction. The fourth end part 402 extends in the direction orthogonal to the axial direction. The fourth end part 402 is parallel to the third end part 401 in the present embodiment.

The second middle part 403 is provided between the third end part 401 and the fourth end part 402 and is joined to both end parts. The second middle part 403 is positioned in the middle of the second end side 400. The second middle part 403 is provided in a linear manner in the present embodiment. The second middle part 403 is parallel to the axial direction. The second middle part 403 extends along the axial direction. Therefore, the second middle part 403 is inclined with respect to the third end part 401 and the fourth end part 402.

The second end side 400 of the second wear plate 200Q follows the first end side 300 of the first wear plate 200P in the present embodiment. Specifically, the first end part 301 of the first end side 300 is parallel to the third end part 401 of the second end side 400. The second end part 302 of the first end side 300 is parallel to the fourth end part 402 of the second end side 400. The first middle part 303 of the first end side 300 is parallel to the second middle part 403 of the second end side 400.

Therefore, the first end side 300 and the second end side 400 exhibit point symmetry on the basis of a center of symmetry CP. The center of symmetry CP is positioned in approximately the middle of a gap 200R between the first wear plate 200P and the second wear plate 200Q.

Moreover, because the first end side 300 and the second end side 400 exhibit point symmetry, the planar shape of the gap 200R also exhibits point symmetry on the basis of the center of symmetry CP. Although not depicted in the drawings, the circumferential surface 41a or the support part 100 of the idler body 41 is exposed on the inside of the gap 200R.

(Operation and Effects)

The wear plate assemblies 42 according to the present embodiment have the arc-like wear plate 200, the first fixing plate 201, and the first fastener 203. The arc-like wear plate 200 is disposed on the circumferential surface 41a of the idler body 41. The first fixing plate 201 fixes the wear plate 200 to the idler body 41. The first fixing plate 201 is fastened to the idler body 41 by the first fastener 203. The wear plate 200 includes the first and second crawler belt contact surfaces 200a, 200b, the guide part 200c, the first abutting surface 200S, and the second abutting surface 200T. The guide part 200c protrudes from the first and second crawler belt contact surfaces 200a. The first abutting surface 200S abuts the idler body 41 and is perpendicular to the axial direction of the rotational center axis AX. The second abutting surface 200T abuts the idler body 41 and is perpendicular to the axial direction. The first abutting surface 200S is provided so as to face the second abutting surface 200T in the axial direction.

In this way, because the first abutting surface 200S and the second abutting surface 200T abut the idler body 41, shifting of the wear plate 200 in the axial direction when a force is applied in the axial direction from the crawler belt 50 to the guide part 200c can be suppressed. Moreover, damage to the first fastener 203 can be suppressed because no force is applied to the first fastener 203 via the first fixing plate 201.

(2) The wear plate 200 has the opening part 200d. The idler body 41 has the protruding part 41e formed on the circumferential surface and disposed inside the opening part. The first abutting surface 200S and the second abutting surface 200T are both portions of the inner side surface Sd of the opening part 200d and abut the protruding part 41e.

Therefore, the wear plate 200 can be made smaller and lighter in comparison to when a portion of the wear plate 200 abuts the outer surface 41b and the inner surface 41c of the idler body 41.

(3) The wear plate assembly 42 has the second fixing plate 202 and the second fastener 204. The second fixing plate 202 fixes the wear plate 200 to the idler body 41. The second fixing plate 202 is fastened to the idler body 41 by the second fastener 204. The first fixing plate 201 is spaced away from the second fixing plate 202 in the circumferential direction.

Therefore, because the wear plate 200 can be fixed by the first fixing plate 201 and the second fixing plate 202, the rise of a portion of the wear plate 200 from the idler body 41 when the wear plate 200 is pressed by the crawler belt 50 can be suppressed.

(4) The opening part 200d of the wear plate 200 extends in the circumferential direction. The first fixing plate 201 and the second fixing plate 202 are disposed inside the opening part 200d.

In this way, the wear plate 200 can be made lighter by increasing the size of the opening part 200d.

(5) The wear plate 200 has the first locking part 200e and the first cushioning member 205. The first locking part 200e locks the first fixing plate 201 and the idler body 41. The first cushioning member 205 is disposed between the first locking parts 200e and the first fixing plate 201.

Therefore, play of the wear plate 200 with regard to the idler body 41 can be suppressed.

(6) The first end side 300 of the first wear plate 200P includes the first end part 301 and the second end part 302. The first end part 301 is inclined with respect to the axial direction.

However, because the crawler belt 50 and the first wear plate 200P abut at the pair of planar rail surfaces 51a and the arc-like first and second crawler belt contact surfaces 200a and 200b, both of the abutting portions exhibit surface contact in a region having a very small width approximately parallel to the axis AX. It is possible that these abutting portions may move in the circumferential direction over the first and second crawler belt contact surface 200a and 200b and the first wear plate 200P may wear away in the abutting portion.

However, if the first end part 301 in the first end side 300 is parallel to the axial direction, when the abutting portion moves over the first crawler belt contact surface 200a and reaches the first end part 301, the contact surface area of the crawler belt 50 and the first wear plate 200P becomes smaller and the abutting portion approximates a state of linear contact. As a result, the load pressure applied near the first end part 301 increases dramatically which may promote local wear near the first end part 301.

Accordingly, the first end part 301 is inclined with respect to the axial direction in the present embodiment. Consequently, linear contact between the crawler belt 50 and the first crawler belt contact surface 200a can be limited. Therefore, local wear near the first end part 301 can be limited because the load pressure applied near the first end part 301 is reduced.

The same result can also be achieved by making the second end part 302 inclined with respect to the axial direction.

(7) The second end side 400 of the second wear plate 200Q includes the third end part 401 and the fourth end part 402. The third end part 401 is inclined with respect to the axial direction.

Therefore, linear contact between the crawler belt 50 and the second crawler belt contact surface 200b can be limited. Therefore, local wear near the first end part 301 can be limited because the load pressure applied near the first end part 301 is reduced.

The same result can also be achieved by making the fourth end part 402 inclined with respect to the axial direction.

(8) The second end side 400 follows the first end side 300. The first end side 300 and the second end side 400 exhibit point symmetry on the basis of the center of symmetry CP.

Therefore, the profile of the first wear plate 200P and the second wear plate 200Q can be the same and productivity of the wear plate 200 can be improved.

Other Embodiments

Although embodiments of the present invention have been described so far, the present invention is not limited to the above embodiments and various modifications may be made within the scope of the invention.

(A) While the sprocket wheel 30 is disposed to the rear of the track frame 10 in the above embodiment, the sprocket wheel 30 may also be disposed in front of the track frame 10. Because the idler wheel 40 is preferably disposed on the opposite side of the sprocket wheel 30 with the track frame 10 interposed therebetween, the idler wheel 40 would be disposed to the rear of the track frame 10 in the above case.

(B) While the support part 100 is formed in a continuous manner around the entire circumference of the circumferential surface 41a in the above embodiment, the support part 100 may be formed intermittently in the circumferential direction.

(C) While the wear plate assembly 42 has the first cushioning member 205 and the second cushioning member 206 in the above embodiment, the first cushioning member 205 and the second cushioning member 206 may not be included.

(D) While the first abutting surface 200S and the second abutting surface 200T are both portions of the inner side surface Sd of the opening part 200d and abut the protruding part 41e of the idler body 41 in the above embodiment, the present invention is not limited in this way. The first abutting surface 200S and the second abutting surface 200T may both be perpendicular to the axial direction and face each other.

Figure 6:
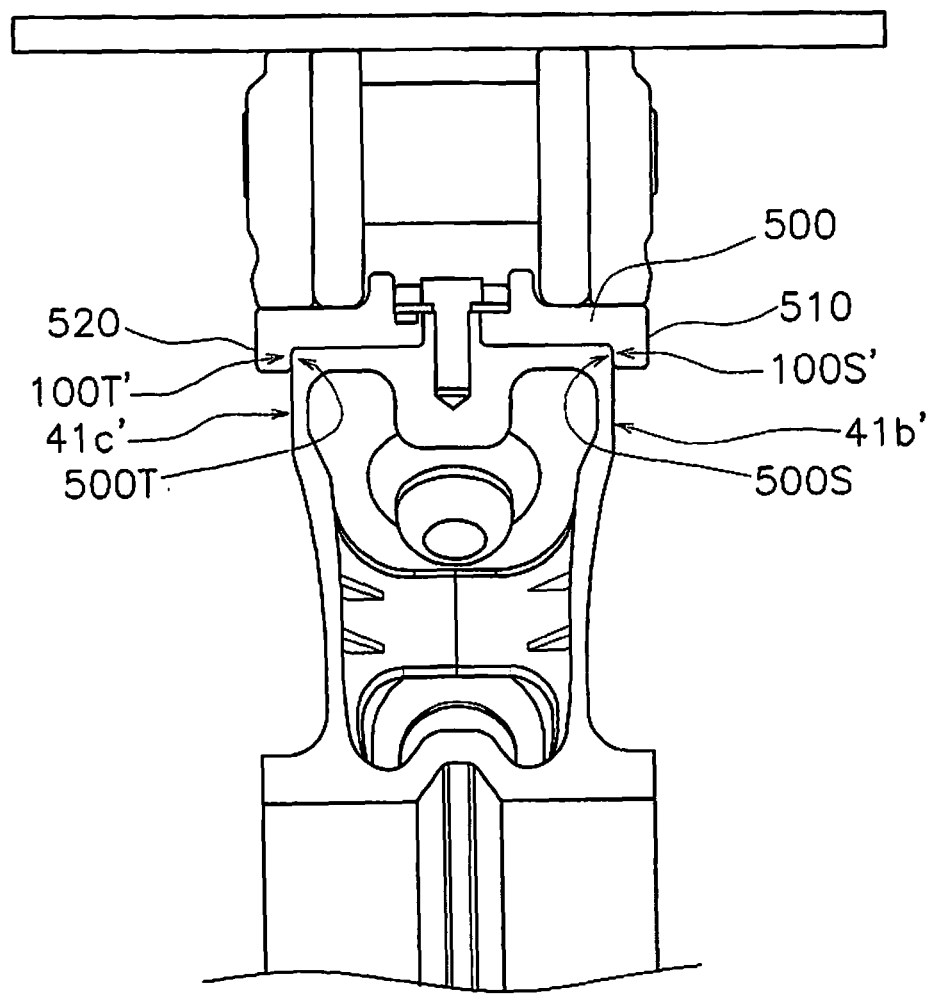
FIG. 6 is a sectional view of an idler wheel.

Therefore as illustrated in FIG. 6, the wear plate 500 may have a first extension part 510 which extends over the outer surface 41b' of the idler body 41', and a second extension part 520 which extends over the inner surface 41c' of the idler body 41'. In this case, the region of the first extension part 510 abutting the outer surface 41b' is a first abutting surface 500S and the region of the second extension part 520 abutting the inner surface 41c' is a second abutting surface 500T. The outer surface 41b' and the inner surface 41c' are the abutted surfaces 100S' and 100T', respectively.

In this way, because the size and shape of the first abutting surface 500S and the second abutting surface 500T can be designed freely when a portion of the wear plate 500 extends over the idler body 41', shifting of the wear plate 500 can be suppressed more effectively.

Figure 7:
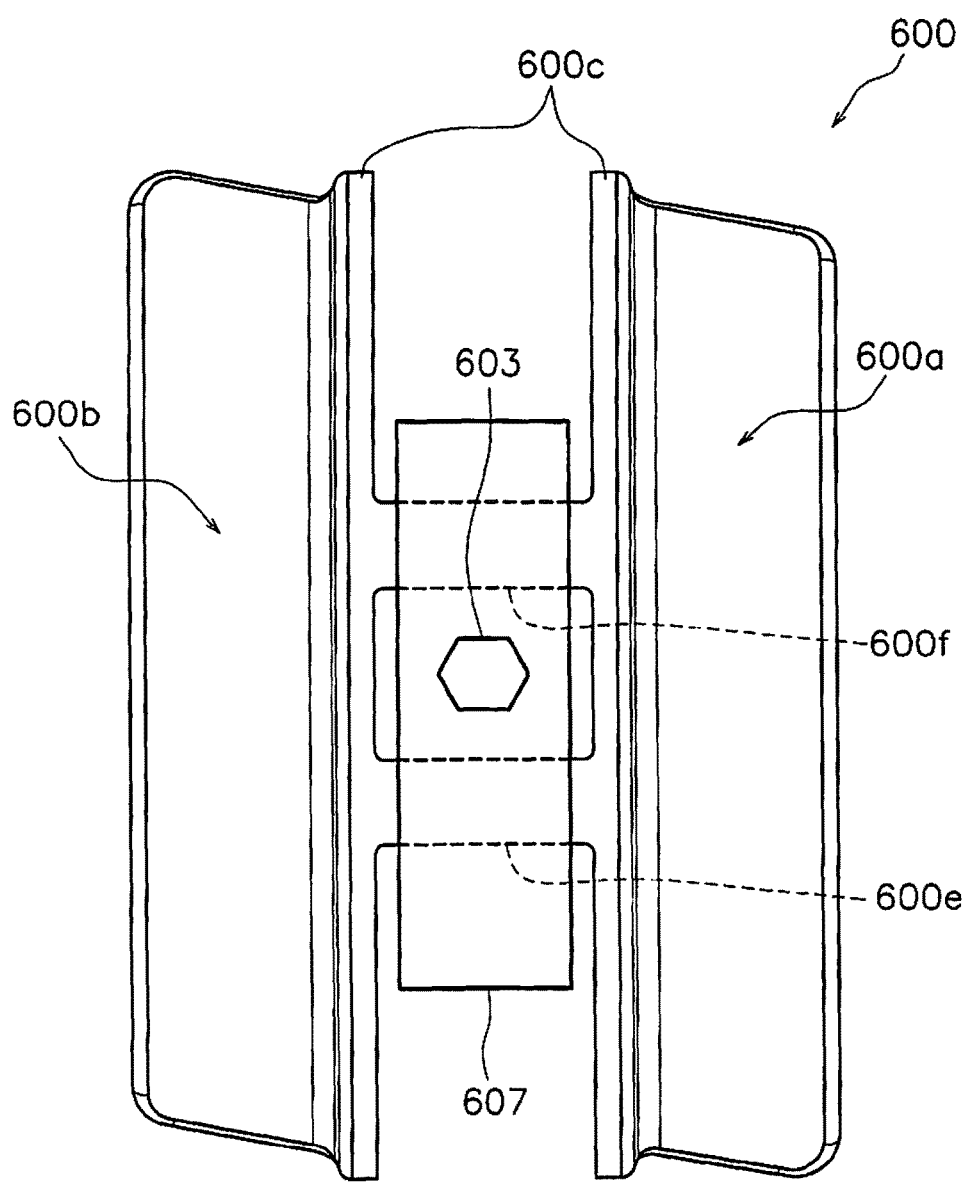
FIG. 7 is a plan view of a wear plate.

(E) While the wear plate 200 has the pair of first locking parts 200e spaced away from each other on the right and left in the above embodiment, the present invention is not limited in this way. As illustrated in FIG. 7, one first locking part 600e may be formed by joining the pair of first locking parts 200e of the previous embodiment on the right and left. Similarly, one second locking part 600f may be formed by joining the pair of second locking parts 200f of the previous embodiment on the right and left. In this case, the wear plate assembly 42 may be provided with one fixing member 607 fastened by one first fastener 603 as illustrated in FIG. 7. In this case, the first and second crawler belt contact surfaces 600a and 600b are basically the same as the first and second crawler belt contact surfaces 200a and 200b of the above embodiment, but the guide part 600c is configured slightly differently than the guide part 200c of the above embodiment.

Figure 8:
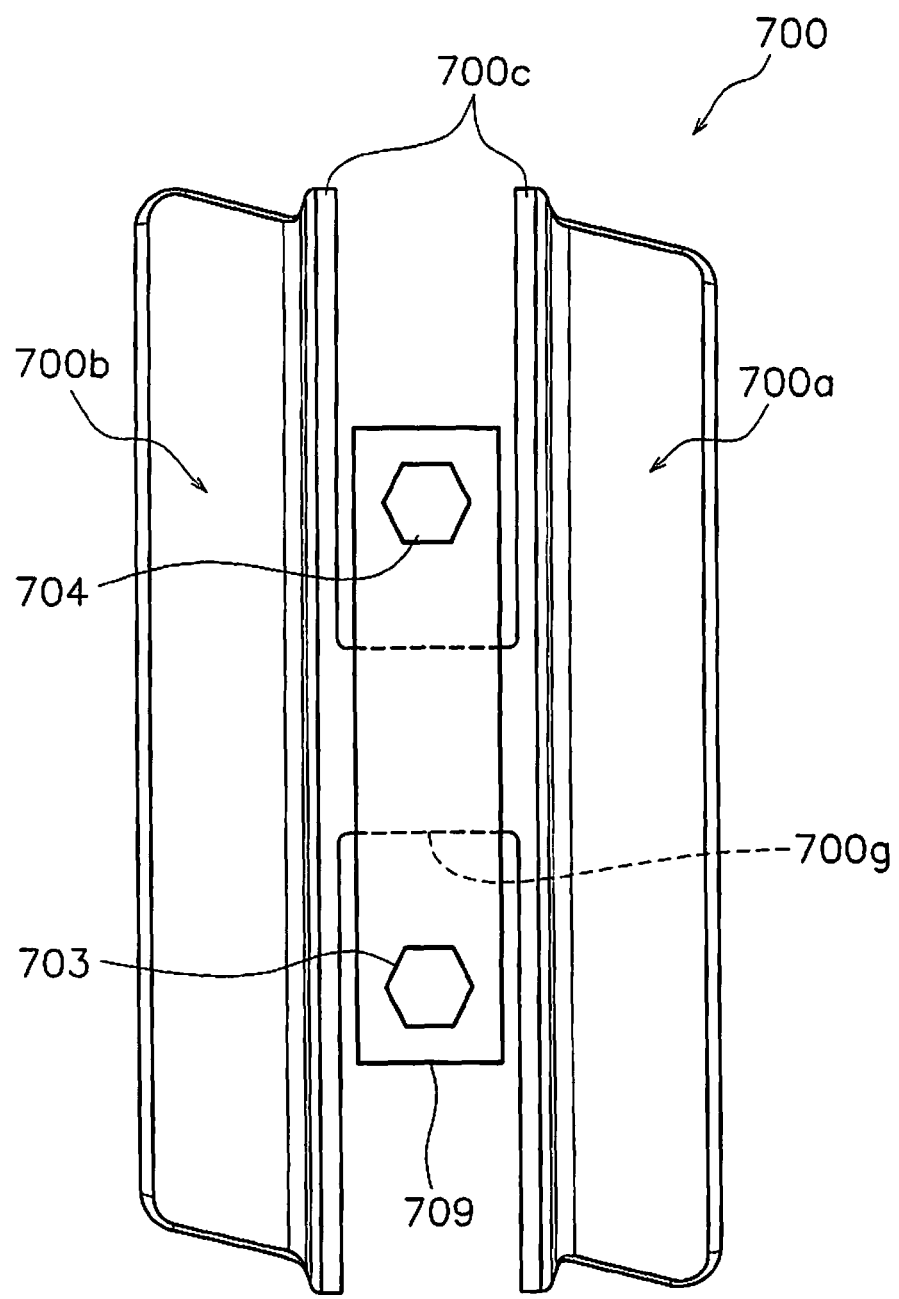
FIG. 8 is a plan view of a wear plate.

(F) While the wear plate 200 has the pair of first locking parts 200e and the pair of second locking parts 200f in the above embodiment, the present invention is not limited in this way. As illustrated in FIG. 8, the wear plate 700 may have one locking part 700g. In this case, the wear plate assembly 42 may be provided with one fixing member 709 fastened by first and second fasteners 703 and 704. In this case, the first and second crawler belt contact surfaces 700a and 700b are basically the same as the first and second crawler belt contact surfaces 200a and 200b of the above embodiment, but the guide part 700c is configured slightly differently than the guide part 200c of the above embodiment.

Figure 9:
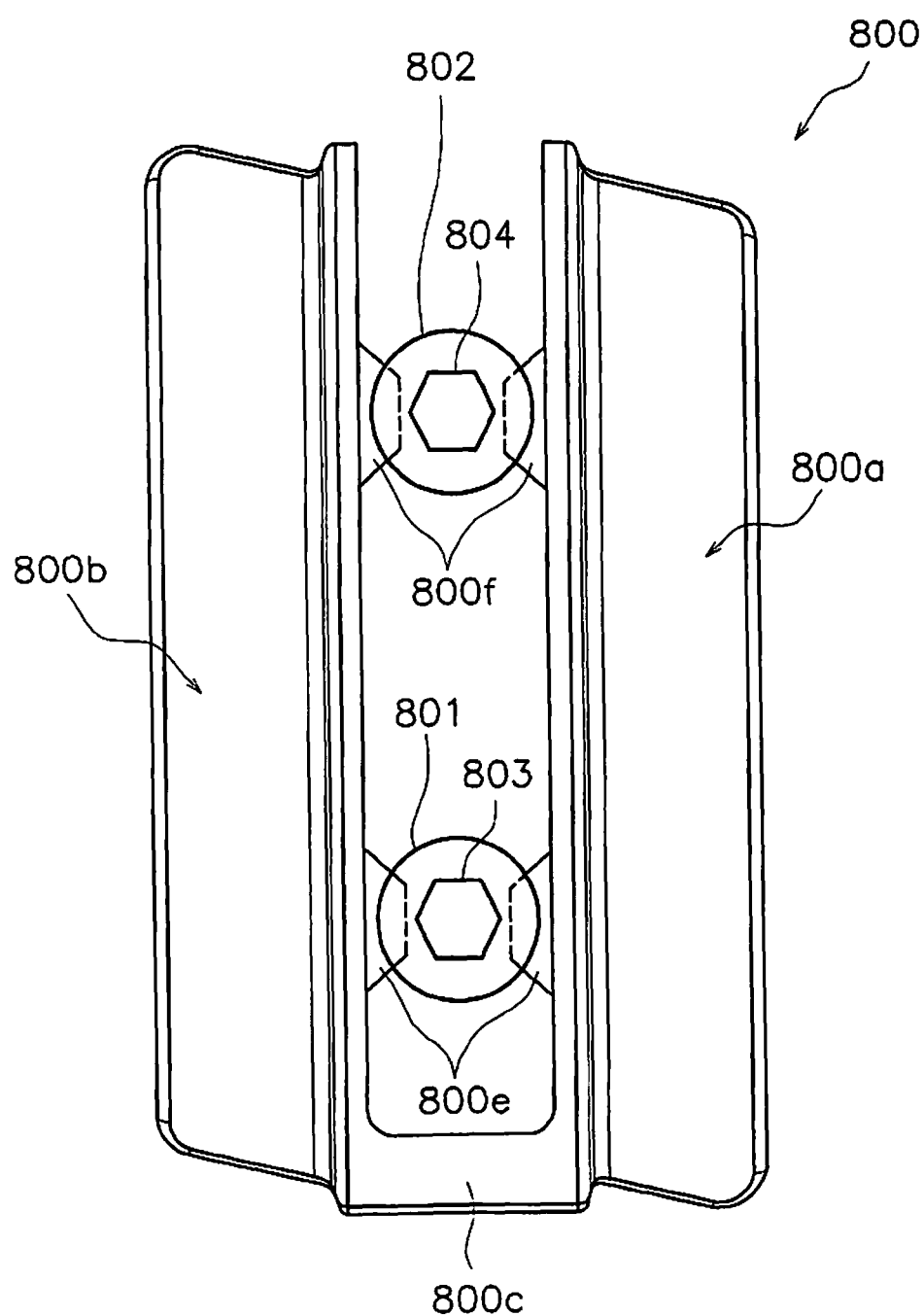
FIG. 9 is a plan view of a wear plate.

(G) While the wear plate 200 has the approximately rectangular-shaped opening part 200d in the middle as seen when viewing the idler body 41 from the radial direction in the above embodiment, the present invention is not limited in this way. The wear plate 200 may have an H-shape as seen in the radial direction as illustrated by the wear plates 600 and 700 shown in FIGS. 7 and 8, or a U-shape as illustrated by the wear plate 800 shown in FIG. 9. In FIG. 9, the first and second crawler belt contact surfaces 800a and 800b are basically the same as the first and second crawler belt contact surfaces 200a and 200b of the above embodiment, and the first and second locking parts 800e and 800f are basically the same as the first and second locking parts 200e and 200f of the above embodiment. The first and second fixing plates 801 and 802 and the first and second fasteners 803 and 804 are also basically the same as the first and second fixing plates 201 and 202 and the first and second fasteners 203 and 204 of the above embodiment.

(H) While the first fixing plate 201 is described as an example of a first fixing member in the above embodiment, the present invention is not limited in this way. The first fixing member may have any shape so long as the wear plate 200 can be fixed directly to the idler body 41 by the first fastener 203. Therefore, the first fixing member may have a round rod shape, a square rod shape, or a cubic shape instead of the planar shape. Accordingly, the second fixing plate 202 described as an example of the second fixing member may also have a shape other than the planar shape.

(I) While the first end side 300 of the first wear plate 200P has the first middle part 303 in the above embodiment, the first end side 300 may not have the first middle part 303 as illustrated in FIGS. 7 and 8. Accordingly, the second end side 400 of the second wear plate 200Q may also be formed in the same way.

Figure 10:
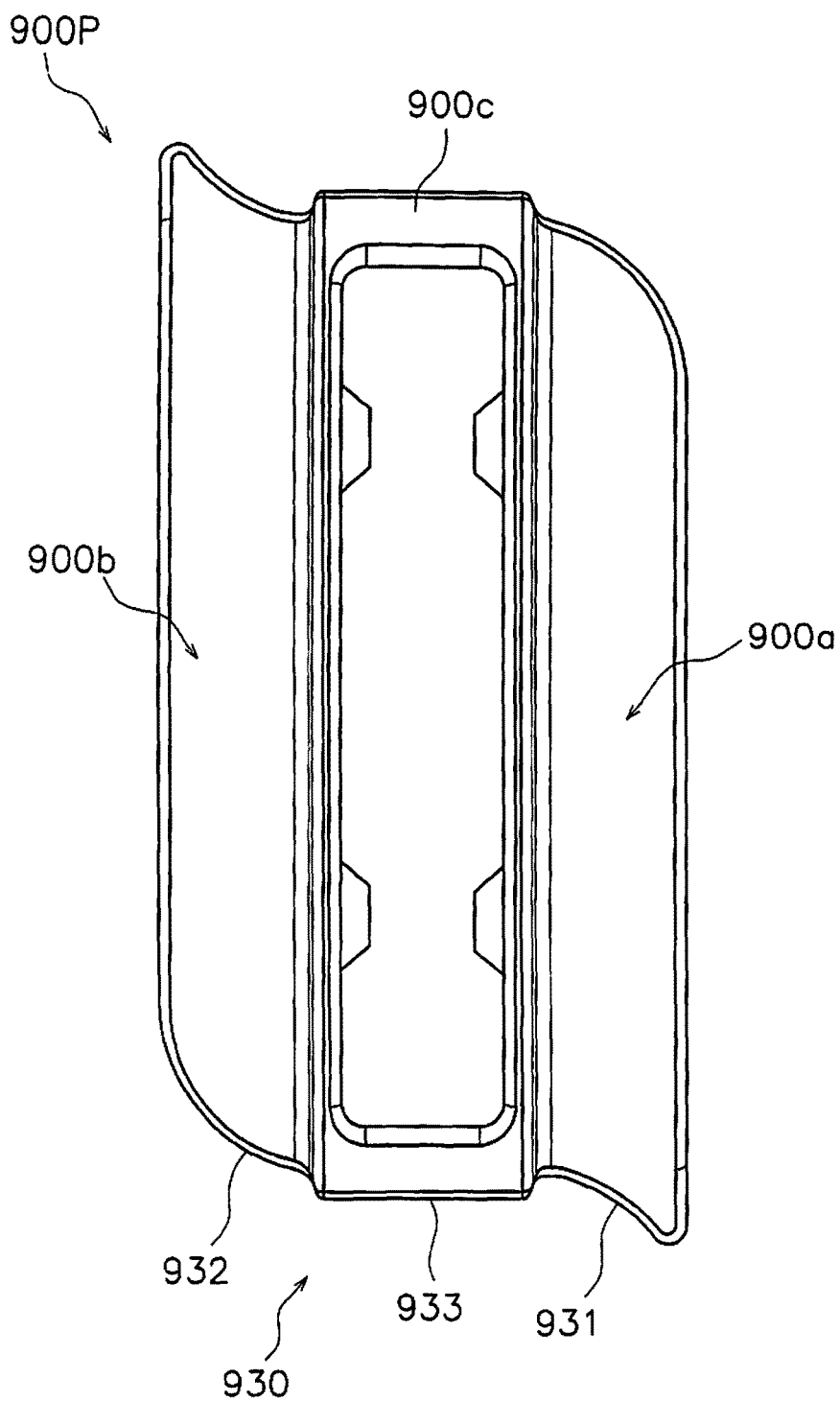
FIG. 10 is a plan view of a wear plate.
Figure 11:
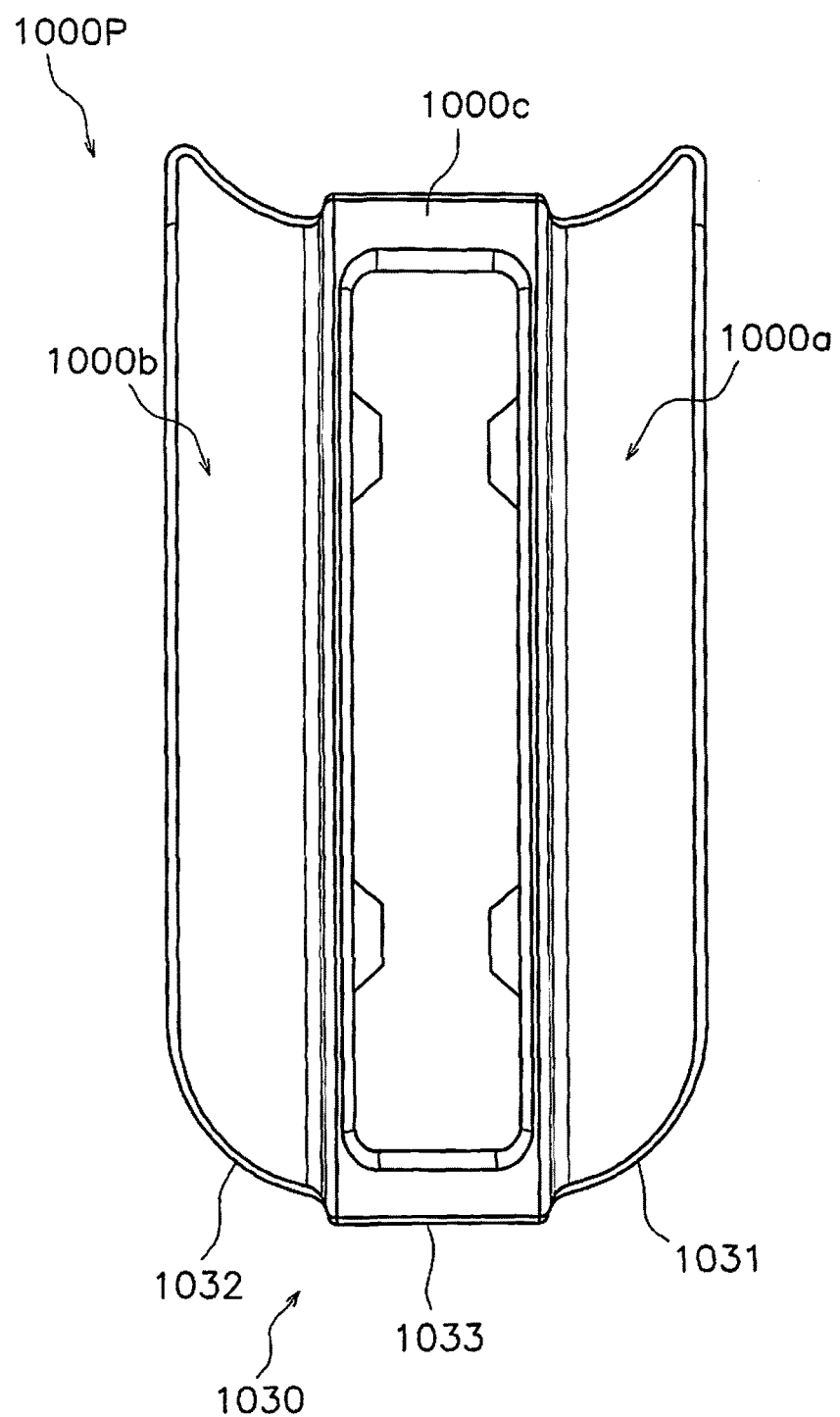
FIG. 11 is a plan view of a wear plate.

(J) While the first end part 301, the second end part 302, and the first middle part 303 of the first end side 300 of the first wear plate 200P are all formed in a linear manner in the above embodiment, the present invention is not limited in this way. As illustrated in FIGS. 10 and 11, it is acceptable to have a first wear plate 900P or 1000P in which the first end part 931 or 1031 and the second end part 932 or 1032 are curved. While not shown in the drawings, the first middle part 933 or 1033 of the first end side 930 or 1030 may also be curved. The second end side 400 of the second wear plate 200Q in the above embodiment may also be formed in the same way as the first wear plates 900P and 1000P shown in FIGS. 10 and 11.

Figure 12:
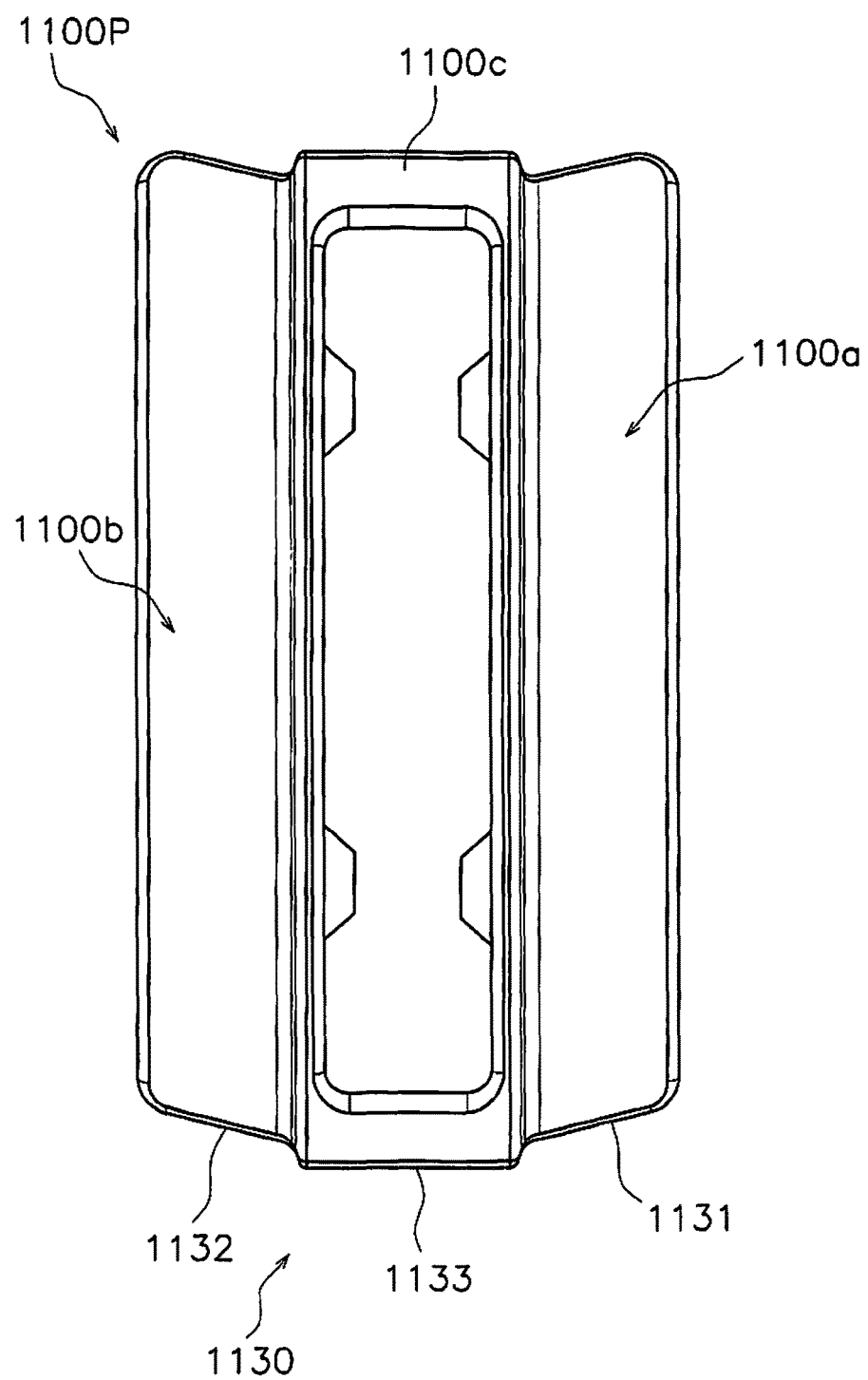
FIG. 12 is a plan view of a wear plate.

(K) While the second end part 302 of the first end side 300 of the first wear plate 200P is parallel to the first end part 301 in the above embodiment, the present invention is not limited in this way. As illustrated in FIG. 12, it is acceptable to have a first wear plate 1100P in which the second end part 1132 is not parallel to the first end part 1131. That is, the extension directions of the first end part 301 and the second end part 302 of the above embodiment may be changed as appropriate. The second end side 400 of the second wear plate 200Q may also be formed in the same way as the first end side 1130 shown in FIG. 12. In FIG. 12, the first and second crawler belt contact surfaces 1100a and 1100b are basically the same as the first and second crawler belt contact surfaces 200a and 200b of the above embodiment, and the guide part 1100c is basically the same as the guide part 200c of the above embodiment. Also, the first middle part 1133 is basically the same as the first middle part 303 of the above embodiment.

(L) While the first end part 301 and the second end part 302 of the first end side 300 of the first wear plate 200P are both inclined with respect to the axial direction in the above embodiment, only one of the first end part 301 and the second end part 302 may be inclined with respect to the axial direction. The second end side 400 of the second wear plate 200Q may also be formed in the same way.

When the crawler-type travel device 1 is attached to the work machine and is traveling, the load pressure applied from the crawler belt 50 at the first crawler belt contact surface 200a positioned further to the outside than the second crawler belt contact surface 200b, is likely to become high. As a result, when only one of the first end part 301 and the second end part 302 is inclined with respect to the axial direction, the first end part 301 positioned further to the outside than the second end part 302 is preferably inclined.

(M) While the first middle part 303 of the first end side 300 of the first wear plate 200P is formed parallel to the axial direction in the above embodiment, the present invention is not limited in this way. The first middle part 303 may be inclined with respect to the axial direction. In this case, the first end part 301, the first middle part 303, and the second end part 302 may continue in a straight line. Accordingly, the second end side 400 of the second wear plate 200Q may also be formed in the same way.

(N) While the first end side 300 and the second end side 400 exhibit point symmetry based on the center of symmetry CP in the above embodiment, the present invention is not limited in this way. The second end side 400 may be formed so as to approximately follow the first end side 300.

INDUSTRIAL APPLICABILITY

According to the present invention, an idler wheel and a crawler-type travel device which are able to suppress damage to the fasteners for fixing the wear plates can be provided which is advantageous in the field of idler wheels and work machines.

What is claimed is:

1. An idler wheel configured to have a crawler belt wound thereon, the idler wheel comprising:
   a disk shaped idler body having a rotational center axis; and
   a plurality of wear plate assemblies disposed so as to encircle a circumferential surface of the idler body, each of the plurality of wear plate assemblies having
   a first fastener fastened to the idler body,
   a first fixing member sandwiched between the first fastener and the idler body so as to abut the first fastener and the idler body, and
   an arc shaped wear plate disposed on the circumferential surface of the idler body, the wear plate including a first locking part locked between the first fixing member and the idler body,
   each wear plate having
   a crawler belt contact surface contacting with the crawler belt,
   a first abutting surface abutting the idler body and being perpendicular to an axial direction of the rotational center axis, and
   a second abutting surface abutting the idler body and being perpendicular to the axial direction,
   the first abutting surface facing the second abutting surface in the axial direction.

2. The idler wheel according to claim 1, wherein each wear plate further has an opening part, the idler body has a protruding part formed on the circumferential surface and disposed inside the opening part, and the first abutting surface and the second abutting surface are portions of an inside surface of the opening part and abut the protruding part.

3. The idler wheel described according to claim 2, wherein
   each wear plate further has a guide part protruding from the crawler belt contact surface to guide the crawler belt onto the crawler belt contact surface, the guide part being provided on a circumferential edge of the opening part.

4. The idler wheel according to claim 2, wherein each first fixing member is arranged inside the opening part.

5. The idler wheel according to claim 1, wherein the idler body has an outer surface that is joined to the circumferential surface, and an inner surface that is joined to the circumferential surface on an opposite side of the outer surface, and
   each wear plate further has a first extending part that extends on the outer surface, and a second extending part that extends on the inner surface, the first abutting surface abuts the outer surface, and the second abutting surface abuts the inner surface.

6. The idler wheel according to claim 1, wherein each of the plurality of wear plate assemblies further has
   a second fastener fastened to the idler body, and
   a second fixing member sandwiched between the second fastener and the idler body so as to abut the second fastener and the idler body,
   the first fixing member being spaced away from the second fixing member in a circumferential direction around the rotational center axis,
   each of the wear plates further including a second locking part locked between the second fixing member and the idler body.

7. The idler wheel according to claim 6, wherein each wear plate further has a guide part protruding from the crawler belt contact surface to guide the crawler belt onto the crawler belt contact surface, the guide part of each wear plate having an opening part that extends in the circumferential direction as seem a plan view, and the first fixing member and the second fixing member are disposed inside the opening part.

8. The idler wheel according to claim 1, wherein each wear plate further has
   a first cushioning part disposed between the first locking part and the first fixing member.

9. The idler wheel according to claim 1, wherein each of the plurality of wear plate assemblies includes a first wear plate and a second wear plate adjacent to each other,
   the first wear plate and the second wear plate each includes a first crawler belt contact surface and a second crawler belt contact surface,
   each first wear plate includes
   a first end part that defines an end on a second wear plate side of the first crawler belt contact surface as seen in a plan view, and
   a second end part that defines an end on the second wear plate side of the second crawler belt contact surface as seen in the plan view,
   the first end part being inclined with respect to the axial direction.

10. The idler wheel according to claim 9, wherein each second end part is inclined with respect to the axial direction.

11. The idler wheel according to claim 9, wherein each second wear plate includes
    a third end part that defines an end on a first wear plate side of the first crawler belt contact surface, and
    a fourth end part that defines an end on the first wear plate side of the second crawler belt contact surface,
    the third end part being inclined with respect to the axial direction.

12. The idler wheel according to claim 11, wherein each fourth end part is inclined with respect to the axial direction.

13. The idler wheel according to claim 12, wherein
    the first end parts and the third end parts exhibit points of symmetry based on a predetermined symmetrical center points as seen in the plan view, and
    the second end parts and the fourth end parts exhibit points of symmetry based on the predetermined symmetrical center points as seen in the plan view.

14. A crawler travel device including the idler wheel of claim 1, the crawler travel device further comprising:
    a track frame;
    a sprocket wheel disposed in front of or behind the track frame; and
    a crawler belt wound onto the sprocket wheel and the idler wheel,
    the idler wheel being disposed on an opposite side from the sprocket wheel with the track frame interposed therebetween.

15. The idler wheel according to claim 1 wherein,
each of the plurality of wear plate assemblies includes a first wear plate and a second wear plate adjacent to each other,
the first wear plate having a first end side that includes a first end part and a second end part,
the second wear plate having a second end side that includes a third end part and a fourth end part, the second end side facing the first end side in the circumferential direction, and
the first end side and the second end side exhibiting point symmetry with respect to a prescribed center of symmetry as seen in a plan view.

16. The idler wheel according to claim 1 wherein,
the idler body includes a protruding part that protrudes radially outward from a circumferential surface of the idler body, a portion of the protruding part abutting the first fixing member.

17. The idler wheel according to claim 16 wherein,
the portion of the protruding part abutting the first fixing member is a first boss configured to receive the first fastener.

* * * * *